US012536085B2

(12) United States Patent
MeenakshiSundaram et al.

(10) Patent No.: US 12,536,085 B2
(45) Date of Patent: Jan. 27, 2026

(54) QUANTUM DOT ENERGIZED HETEROGENEOUS MULTI-SENSOR WITH EDGE FULGURATED DECISION ACCOMPLISHER

(71) Applicant: Bank of America Corporation, Charlotte, NC (US)

(72) Inventors: Meenakshi MeenakshiSundaram, Chennai (IN); Nithya C, Chennai (IN); Suki Ramasamy, Chennai (IN); John Dinakar Iruvanti, Telegana (IN)

(73) Assignee: Bank of America Corporation, Charlotte, NC (US)

(*) Notice: Subject to any disclaimer, the term of this patent is extended or adjusted under 35 U.S.C. 154(b) by 1051 days.

(21) Appl. No.: 17/575,814

(22) Filed: Jan. 14, 2022

(65) Prior Publication Data
US 2023/0229154 A1 Jul. 20, 2023

(51) Int. Cl.
G06F 11/30 (2006.01)
(52) U.S. Cl.
CPC ...... *G06F 11/3089* (2013.01); *G06F 11/3072* (2013.01)
(58) Field of Classification Search
CPC . G06F 11/3072; G06F 11/3089; G06N 10/00; G06N 10/60; G06N 10/80; G06N 20/00; H04L 41/0654; H04L 41/0816; H04L 41/145; H04L 41/16; H04L 43/04; H04L 43/06; H04L 67/10; H04L 67/1008; H04L 67/101
See application file for complete search history.

(56) References Cited

U.S. PATENT DOCUMENTS

| 7,124,180 | B1* | 10/2006 | Ranous | H04L 12/4633 709/224 |
|---|---|---|---|---|
| 9,785,505 | B1* | 10/2017 | Narzisi | G06F 11/1675 |
| 11,509,599 | B1* | 11/2022 | Nijim | G06F 9/45558 |
| 2007/0283005 | A1* | 12/2007 | Beliles | H04L 41/0816 709/224 |
| 2017/0018688 | A1* | 1/2017 | Mazed | G09G 3/035 |
| 2019/0121350 | A1* | 4/2019 | Cella | G16Z 99/00 |
| 2022/0353130 | A1* | 11/2022 | Shen | H04L 41/0806 |
| 2022/0360957 | A1* | 11/2022 | Seawall | H04L 67/12 |

OTHER PUBLICATIONS

Oct. 9, 2024—US Notice of Allowance—U.S. Appl. No. 18/422,408.

* cited by examiner

*Primary Examiner* — Christopher Biagini
(74) *Attorney, Agent, or Firm* — Banner & Witcoff, Ltd.

(57) ABSTRACT

Aspects described herein relate to a centralized computing system that interacts with a plurality of data centers, each having an edge server. Each edge server obtains sensor information from a plurality of sensors and processes the sensor information to detect an imminent shutdown and sends emergency data to a centralized processing entity when detected. In order to make a decision, the edge server processes the sensor data based on dynamic sensor thresholds and dynamic prioritizer data by syncing with the centralized computing system. Because of the short time duration to report emergency data before an imminent complete shutdown, an edge server may utilize a quantum data pipeline and quantum data storage as a key medium for all data transfer in a normal condition and at the time of emergency for internally transporting processed sensor data and providing the emergency data to the centralized processing entity.

17 Claims, 9 Drawing Sheets

QUANTUM DOT ENERGIZED HETEROGENEOUS MULTI-SENSOR WITH EDGE FULGURATED DECISION ACCOMPLISHER

TECHNICAL FIELD

One or more aspects of the disclosure generally relate to computing devices, computing systems, and computer software. In particular, one or more aspects of the disclosure generally relate to computing devices, computing systems, and computer software that may be used to monitor and process sensor information from one or data centers.

BACKGROUND

Natural calamities or man-made events that affect data centers are crucial to the functioning of a business. However, emergency data indicative of the reasons for the malfunctioning of a data center may be lost or not even transmitted to a centralized computing center (often in the cloud) before a complete shut-down. Hence, a fallback strategy may be difficult to achieve in such a situation.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects described herein may relate to a centralized computing system that interacts with a plurality of data centers, each having an edge server. Each edge server obtains sensor information from a plurality of sensors and processes the sensor information to detect an imminent shutdown and sends emergency data to a centralized processing entity when detected.

With an aspect of the embodiments, an edge server of a data center processes the sensor data based on dynamic sensor thresholds and dynamic prioritizer data by syncing with the centralized computing system.

With an aspect of the embodiments, an edge server may utilize a quantum data pipeline and quantum data storage as a key medium for all data transfer in a normal condition and at a time of emergency for internally transporting processed sensor data and providing the emergency data to the centralized processing entity.

With another aspect of the embodiments, an edge server of a data center comprises a sensor storage configured to receive sensor data from a plurality of sensors, to store the sensor data, and to send the sensor data to a data filter, a local prioritizer configured to validate whether the sensor data is above or below a threshold value and to generate a validation signal about the validation, a local collaborator engine, a data storage, and a data pipeline. The data filter is configured to obtain the sensor data from the sensor storage, to filter the sensor data based on dynamic sensor threshold data, and to provide the filtered sensor data to the local collaborator engine. The localized collaborator engine is configured to prioritize collected sensor data and to present the prioritized data to a local fuzzy probabilistic controller logic (FPCL). The local FPCL is configured to obtain the collected sensor data from the localized collaborator engine and to process the collected sensor data using fuzzy logic on the collected sensor data to obtain localized decision output data. The data storage is configured to store the localized decision output data, where the data pipeline connects an output of the local FPCL and the data storage and is configured to transport the localized decision output data from the local FPCL to the data storage.

With another aspect of the embodiments, a data pipeline comprises a quantum data pipeline and a data storage comprises a quantum data storage.

With another aspect of the embodiments, an edge server of a data center comprises a data combiner configured to combine the localized decision output data with processed sensor data in which the combined data is transported over the data pipeline to the data storage.

With another aspect of the embodiments, a quantum dot panel is embedded within at least one sensor (some or all) of the plurality of sensors of a data center so that the at least one sensor is self-powered.

With another aspect of the embodiments, a centralized computing system may be implemented completely or partially with computing cloud services.

With another aspect of the embodiments, a local prioritizer of an edge server is configured to synchronize synchronization data with a central prioritizer of a centralized computing system.

With another aspect of the embodiments, a local prioritizer of an edge server receives a dynamic sensor threshold value for the sensor data from a centralized computing system. The local prioritizer adjusts the received dynamic sensor threshold based on a localized edge sensor threshold value.

With another aspect of the embodiments, a local fuzzy probabilistic controller logic (FPCL) is configured to hierarchically combine the collected sensor data from random sets, where the sensor data may be partitioned into heterogeneous sensor data and homogeneous sensor data.

With another aspect of the embodiments, a gateway is configured to monitor data traffic from a plurality of sensors of a data center and to detect whether an exception occurs. A monitoring and control engine (MCE) is configured to generate a signal to one of the plurality of sensors associated with the exception.

With another aspect of the embodiments, a centralized computing system is connected to a plurality of edge servers of a data center. The centralized computing system comprises a central prioritizer configured to synchronize synchronization data with a localized prioritizer of each edge server, a central collaborator engine configured to collect edge data from the plurality of edge servers and to prioritize the collected edge data, and a global fuzzy probabilistic controller logic (FPCL) configured to obtain prioritized collected edge data from the central collaborator engine and to apply fuzzy logic on the prioritized collected edge data to obtain global decision output data.

With another aspect of the embodiments, a central collaborator engine of a centralized computing system consumes edge data from the plurality of edge servers and provides the dynamic sensor threshold data and dynamic prioritization data from the edge data.

With another aspect of the embodiments, a central collaborator engine utilizes a self-mutating algorithm based calculator to determine the dynamic sensor threshold data and dynamic prioritization data.

With another aspect of the embodiments, a global FPCL of a centralized computing system is configured to hierarchically combine the prioritized collected edge data from a central collaborator engine.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

A data center may experience an emergency situation (for example, electrical power outage or fire accident). In such a situation, emergency data is last minute data recorded from various sensors. Furthermore, the order of occurrence of sensor data may be important in understanding the root cause of issue. For example, a fire caused by a fuel/diesel generator may be identified by the ordering: power outage, usage of generator, and fire alarm. If such information is lost during a power outage or fire accident, analyzing the root cause may be difficult to construct.

With some embodiments, emergency data may be transferred through a quantum dot pipeline that provides fast transmission rate at low voltage levels. Such an approach is often adequate to sufficiently operate in the environment during an emergency situation.

Embodiments are directed to a centralized computing system that interacts with a plurality of data centers, each having an edge server. Each edge server obtains sensor information from a plurality of sensors and processes the sensor information to detect an imminent shutdown and sends emergency data to a centralized processing entity when detected. In order to make a decision that an emergency is imminent, the edge server processes the sensor data based on dynamic sensor thresholds and dynamic prioritizer data by syncing with the centralized computing system.

Because of the short time duration to report emergency data before an imminent complete shutdown, an edge server may utilize a quantum data pipeline and quantum data storage as a key medium for all data transfer in a normal condition, and including at the time of emergency condition as well, for internally transporting processed sensor data and providing the emergency data to the centralized processing entity.

Figure 1:
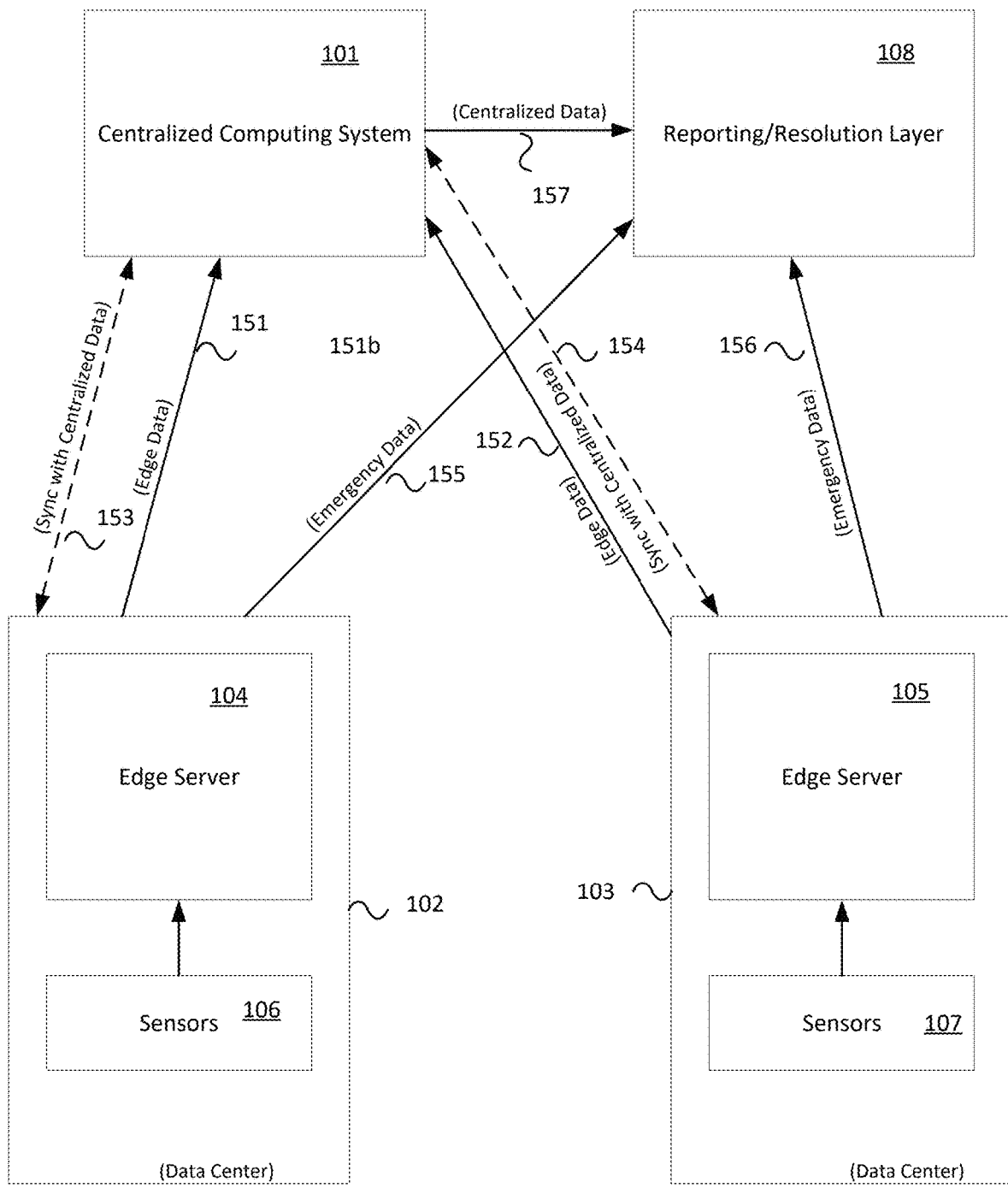
FIG. 1 illustrates a plurality of data centers to provide edge data to a centralized computing system and a reporting/resolution layer in accordance with one or more example embodiments.

FIG. 1 illustrates a plurality of data centers 102-103 that provide emergency data to centralized computing system 101 (which may be implemented in a cloud) and reporting/resolution layer 108 (which may be implemented with a computing device) when a shutdown is expected in accordance with one or more example embodiments.

As shown in FIG. 1, data center 102 comprises edge server 104 and sensors 106.

When data center 102 anticipates a shutdown (for example, a loss of electrical power) based on the sensor data provided by sensors 106, edge server 104 transmits emergency data 155 to reporting/resolution layer 108 and/or centralized computing system 101.

Data centers 102 and 103 provide edge data (for example, processed sensor data and emergency data as will be discussed) via paths 151 and 152, respectively, to centralized computing system 101 so that centralized computing system 101 can determine centralized data for data centers 102 and 103.

Centralized data (for example, dynamic prioritization data and dynamic sensor thresholds as will be discussed) for edge servers 104 and 105 and centralized computing system 101 are synchronized via sync paths 153 and 154. The values of sensor threshold and prioritization data from centralized computing system 101 may be calculated and then transmitted to and stored in edge server 104 as a dynamic value to arrive at enhanced functioning for a high alert mechanism needed for critical functions. For example, the sensor threshold data from different edge servers may be processed by centralized computing system 101 (for example in a "cloud" using computing cloud services) and may be added to a localized threshold value of edge server 104.

Centralized computing system 101 processes edge data from edge servers 102 and 103 and provides centralized data 157 to reporting/resolution layer 108 about the status of data centers 102 and 103. Additionally, data centers 102 and 103 may provide emergency data 155 and 156, respectively) when data centers 102 or 103 encounters an outage situation (for example, electrical power or fire). With some embodiments, reporting/resolution layer 108 may be implemented on the same platform as centralized computing system 101 or on a separate computing device.

Figure 2:
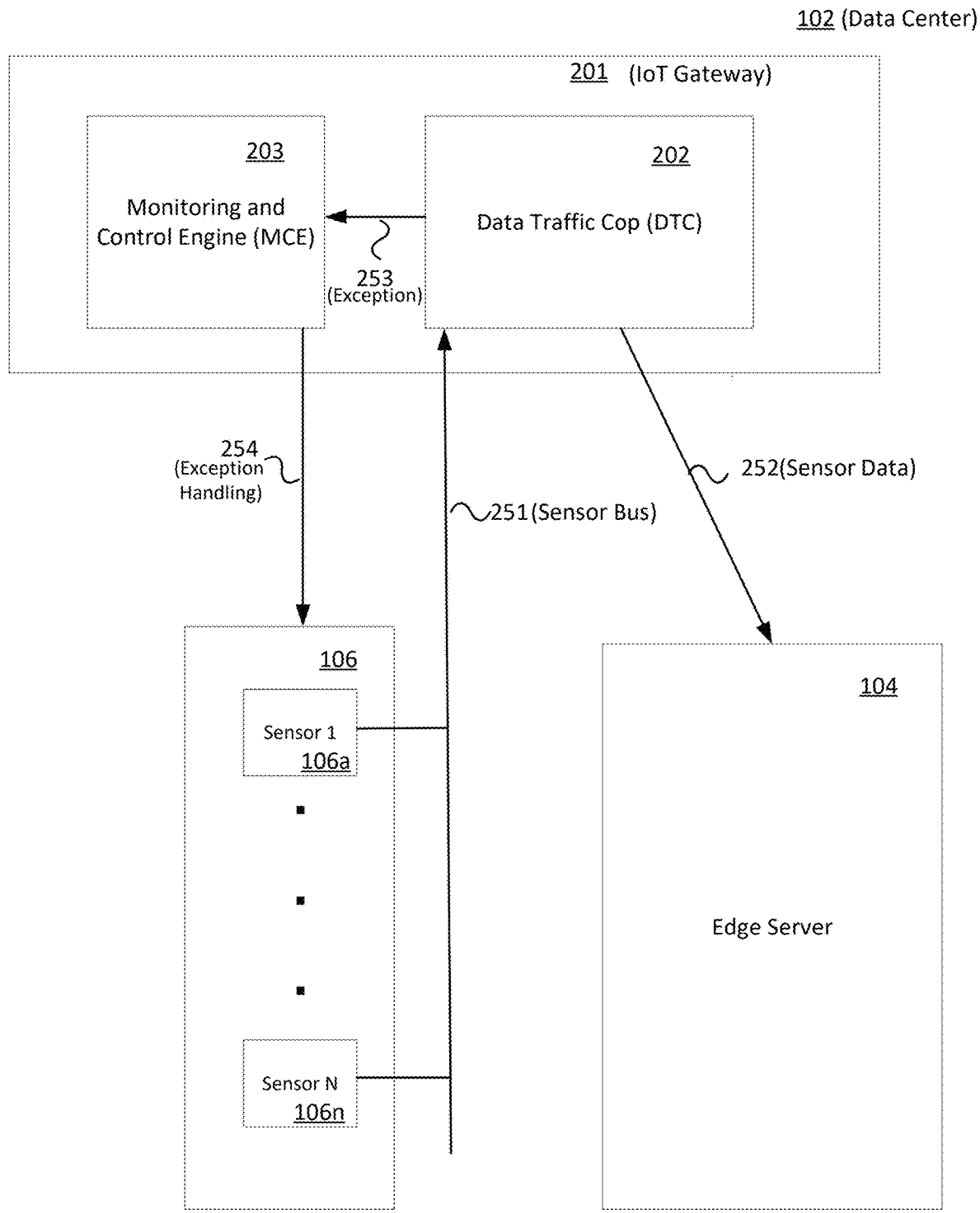
FIG. 2 illustrates a data center in accordance with one or more example embodiments.

FIG. 2 illustrates data center 102, which comprises sensors 106a-106n, IoT gateway 201, and edge server 104.

Sensors 106a-106n comprises security sensors, fire sensors, carbon emission sensors, temperature sensors, light sensors, smoke sensors, weather forecast information, and other types of sensors that are needed. As will be discussed, sensor data from homogeneous and heterogeneous sensors may be combined via randomized hierarchical combining to obtain a decision output about an emergency situation. Also, some of sensors 106a-106n may measure the same physical characteristic (for example, fire or temperature) but may be distributed throughout different regions of data center 102.

Homogeneous sensors refer to hierarchal combining of the same type of sensors, for example one temperature sensor versus another temperature sensor at different locations. Heterogeneous sensors refer to hierarchal combining of different types of sensors, for example, fire versus smoke sensors.

With some embodiments, at least one of sensors $106a$-$106n$ may be electrically self-powered by one or more quantum dot panels (quantum dot solar cells) embedded within the sensor. Moreover, the one or more quantum dot panels may convert heat produced inside data center 102 to electrical power for the at least one of sensors $106a$-$106n$. The above approach may provide additional robustness during an emergency situation when external electrical power is diminished or lost.

Sensor data is obtained via sensor bus 251 and conveyed through IoT Gateway 201 where data traffic cop (DTC) 202 monitors the traffic for the sensor data. Exceptions arising due to data transmission is handled through a monitoring and control engine (MCE) 203. Information about the exceptions may then be transmitted to reporting and resolution layer 108. Otherwise, sensor data 252 is sent to edge server 104 for processing as will be discussed.

When MCE 203 encounters exception 253 with one of sensors $106a$-$106n$, MCE 203 may generate a signal to the corresponding sensor in order address the exemption. For example, when the corresponding sensor is not transmitting sensor data, MCE 203 may ping the sensor to activate it or restart the corresponding sensor via an actuator (for example, to start a cooling fan or valve).

Figure 3:
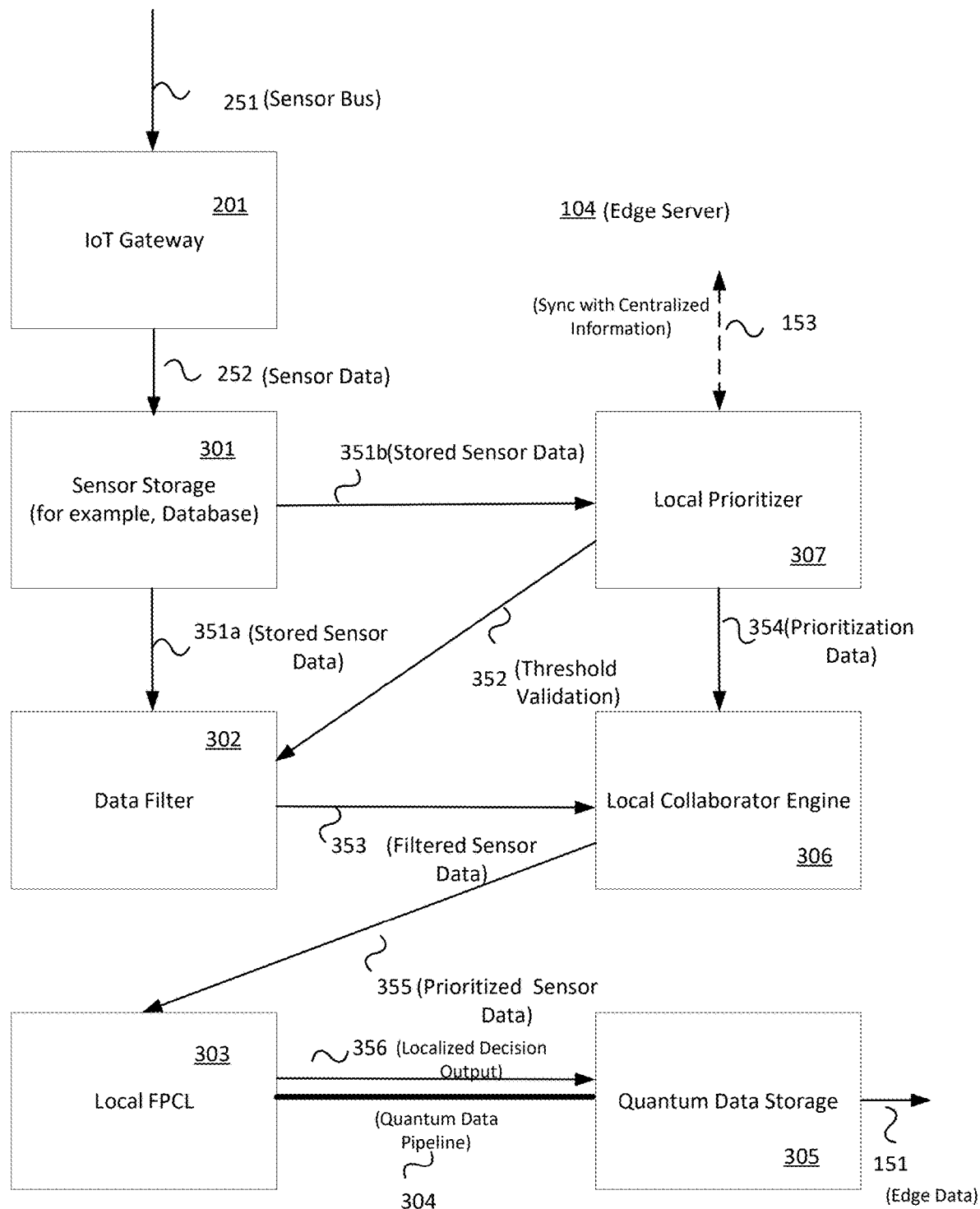
FIG. 3 illustrates an edge server of a data center as shown in FIG. 2 according to one or more illustrative embodiments.

FIG. 3 illustrates edge server 104 of data center 102 as shown in FIGS. 1 and 2 according to one or more illustrative embodiments.

All of sensor data 252 is stored in data storage 301 (for example a database) at edge server 104. The stored sensor data $351a$ is then filtered by data filter 302 according to dynamic sensor threshold data and prioritization data from local prioritizer 307. Also, stored sensor data $352b$ is sent to local prioritizer 307 for validation. For example, local prioritizer 307 may verify whether the sensor data is above or below a threshold value depending on the sensor type. A sensor typically has a corresponding threshold value that may be determined by edge server 104 based on synchronization data from centralized computing system 101 and adjusted by edge server 104 based on characteristics of data center 101. Different sensors typically have different threshold values, where some are constant across geographical location (for example, carbon emission) while some vary based on the geographical location (for example, weather) and local policies.

Local prioritizer 307 also provides prioritization data 354 to collaborator engine 306 based on synchronization data received from centralized computing system 101. Prioritization data 354 gauges the importance of different sensor data with respect to an outage situation. For example, centralized computing system 101 may determine prioritization data 354 based on sensor data obtained previous and during an emergency situation from edge servers 104 and 105.

Local collaborator engine 306 may decide to send emergency data when a shutdown of data center 102 is expected. This decision may be based on high priority alerts such as a fire alarm. It then sends the emergency data to the cloud (for example, central computing system 101).

With some embodiments, local prioritizer 307 provides the priority logic (including a dynamic value with priority components added and ranked through the cloud). For example, the logic may prioritize the sensors in an order of importance.

Local prioritizer 307 may support priority logic, in which a dynamic value for prioritization data 354 is determined by priority components being added and ranked through the cloud (for through centralized computing system 101).

Local prioritizer 307 and global prioritizer 401 may use emergency information, company policy, industry standards, and/or regulations. For example, some regions within a country may be prone to more earthquakes, where an earthquake occurs in Location A (corresponding to a high seismic zone). This information may be utilized by local prioritizer 307. This information may then be passed to global prioritizer 401 to be included as lessons learnt and used for a decision making process through global FPCL 403.

Filtered data 353 is then sent to local collaborator engine 306 in order to prioritize filtered data 353 based on the prioritization data 354. Prioritized sensor data 355 is then sent to local fuzzy probabilistic controller logic (FPCL) 303.

Local collaborator engine 306 may prioritize filtered data 353 based on polices and standards.

Local FPCL 303 processes prioritized sensor data 355 by hierarchically combining it and applying fuzzy logic, where prioritized sensor data 355 is based on sensor data from sensors $106a$-$106n$ as shown in FIG. 1. As will be discussed, sensor data from both homogeneous and heterogeneous are paired and fuzzy logic is applied to each pair in order to obtain the next layer of the hierarchical combining. These FPCL operations are repeated until localized decision output 356 is obtained.

Although local FPCL 303 may be presented with near real time sensor data, FPCL 303 may be, alternatively or in conjunction with, presented with historical sensor data and/or emergency data. For example, near-real time temperature sensor data may be paired with corresponding sensor data from the previous hour or day.

With some embodiments, local FPCL 303 may further randomize the hierarchical combining. For example, local FPCL 303 may select random sensor sets from both homogeneous and heterogeneous types of prioritized sensor data 355.

Local FPCL 303 may hierarchically use real time dynamic sensor threshold data, dynamic prioritizer data, and history data to arrive at a right decision as reflected in localized decision output 356.

Figure 4:
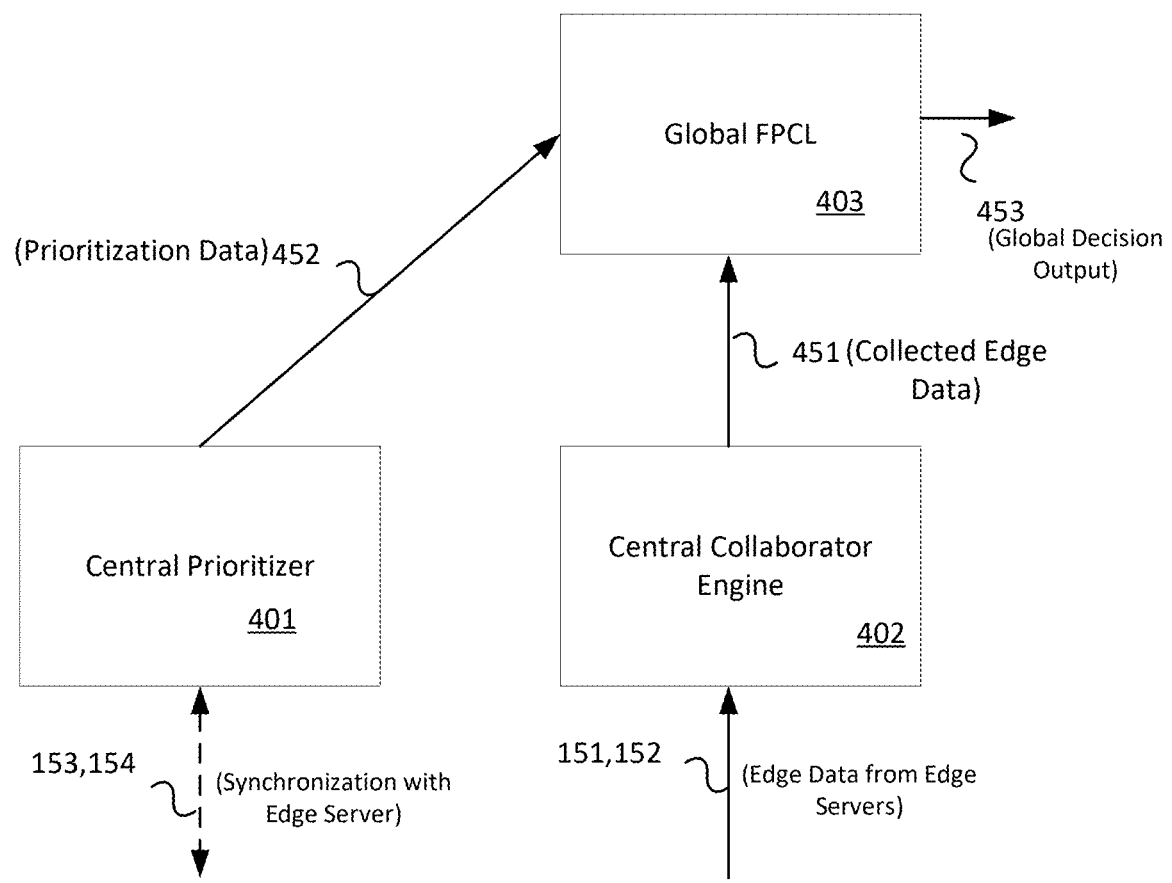
FIG. 4 illustrates a centralized computing system as shown in FIG. 1 in accordance with one or more example embodiments.
Figure 5:
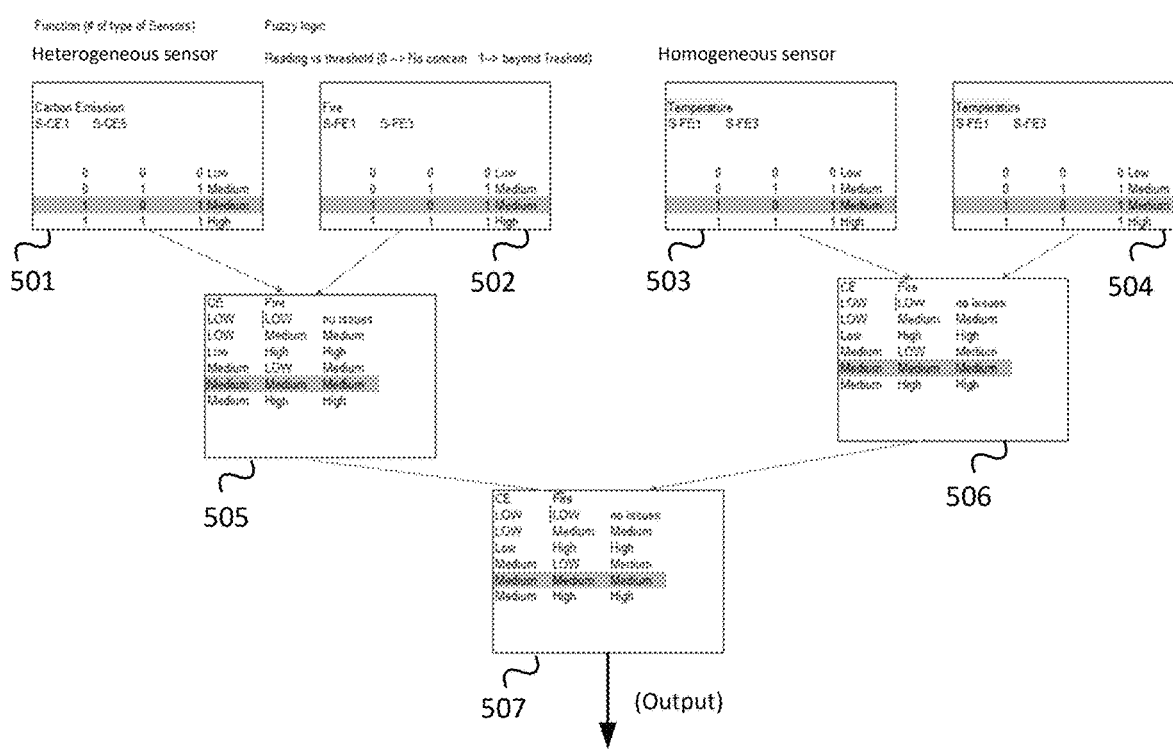
FIG. 5 illustrates an exemplary Fuzzy Probabilistic Controller Logic (FPCL) as shown in FIG. 3 according to one or more illustrative embodiments.

FIG. 5 shows an example of hierarchical combining by local FPCL 303 as well as global FPCL 403 as will be discussed at FIG. 4. Sensor data from carbon emission and fire sensors (corresponding to heterogeneous sensors) are combined while sensor data from temperature sensors (corresponding to homogeneous sensors) are combined according to fuzzy logic to obtain an output ("no issues", "LOW", "MEDIUM", or "HIGH"). A digital representation of the FPCL output is stored in quantum data storage 304 via quantum data pipeline 303. For example, binary representations '00', '01', '10', and '11' may correspond to fuzzy logic values "no issues", "LOW", "MEDIUM", and "HIGH", respectively. However, as will be appreciated by one of ordinary skill in the art, embodiments may use additional binary bits to represent additional fuzzy logic values.

The resulting output from local FPCL 303 and global FPCL 403 may be used on a local or global basis, respectively, to initiate an appropriate action. For example, when the output of local FPCL 303 is "High," edge server 104 may switch on fans if a heat sensor is above a threshold limit or may generate an alert if a carbon emission sensor is high.

With some embodiments, local FPCL 303 uses hierarchically real time dynamic sensor threshold data, dynamic prioritizer data, and history data to arrive at a decision. Processing by edge server 104 by local FPCL 303 may be used to process high critical alerts in premises (localized) enabling a quick edge decision.

The output of local FPCL 303 (along with possibly other edge data such as processed sensor data (for example, from local collaborator engine 306 and/or local prioritizer 307 although not explicitly shown in FIG. 3) is then directed through quantum data pipeline 303 and then stored in quantum data storage 304. Quantum data storage 304 may require only a very low voltage to operate properly and consumes less electrical power than typical storage devices, thus providing critical data up until the last moment of the shutdown emergency and enabling enhanced decision making through reporting and resolution layer 108.

Quantum data pipeline 304 may comprise a quantum wire that may transmit data at a speed of 100 GB/second. Quantum storage 305 may comprise a quantum dot storage having a density of 1 TB/cm$^2$, which is approximately 20 times larger than typical magnetic storage.

Quantum data pipeline 304 and quantum storage 305 may utilize quantum dots (QDs) that are synthetic nano-scale crystals that transport electrons. They are typically zero dimensional crystalline semiconducting nanoparticles with diameters less than 10 nm and may be fabricated as a metalloid crystalline core.

Storage and data transmission using quantum dots enables seamless transmission of data even in the case of low voltage of operation. This approach may also prevent loss of data when there is power shutdown that is crucial for decision making. High speed quantum dot communication through quantum data pipeline 304 provides real time data transfer at a high speed.

Quantum data pipeline 304 and quantum data storage 305 enables that the FPCL output (decision) be transmitted and then saved to the "cloud" (for example, centralized computing system 101 and/or reporting/resolution layer 108), thus circumventing crucial data loss during contingency as it operates even at a low voltage.

While FIG. 3 explicitly shows only the transport of the FPCL output (localized decision output 356), from quantum data pipeline 304 to quantum data storage 305, quantum data pipeline 304 and quantum data storage 305 may provide a medium for all data transfer (corresponding to edge data 151) in a normal condition and including, at the time of emergency as well, for internally transporting processed sensor data and providing the emergency data to a centralized entity such as centralized processing system 101. For example, transported data may include processed sensor data and emergency data from edge server 104 as well as localized decision output 356.

While embodiments may utilize quantum data pipeline 304 and quantum data storage 305, some embodiments may utilize other technologies for data transport and data storage. For example, while current optical fiber may transmit at less than 10 GB of data per second, embodiments may utilize technologies (such as quantum dot storage and quantum wire) that support a recording density of 1 TB/cm$^2$ and a data transmission rate of 100 GB/second.

FIG. 4 illustrates centralized computing system 101 (which may be supported in a "cloud") as shown in FIG. 1 in accordance with one or more example embodiments. For example, centralized computing system 101 may be completely or partially implemented using computing cloud resources/services.

Central collaborator engine 402 obtains edge data 151 and 152 (for example, processed sensor data and emergency data) from edge servers 104 and 105, respectively.

Edge data from edge servers 104 and 105 across multiple locations are collated at central collaborator engine 402, resulting in centralized decision making.

Centralized collaboration engine 402 consumes data from all edge servers (for example edge data 151 and 152 from edge servers 104 and 105, respectively) and provides critical threshold and prioritization data. Outputs from various edge servers across multiple locations are collated by collaborator engine 402 and in turn leading to a centralized decision making.

Central prioritizer 401 may obtain calculated prioritization data and sensor threshold data from the central collaborator engine 402 to synchronize with edge servers 104 and 105.

The dynamic sensor threshold and prioritization are calculated by centralized computing system 101 and then transmitted and stored at edge server 104 as a dynamic value to arrive at enhanced functioning of the high alert mechanism needed for critical functions.

Different types of sensors typically have different threshold values. For example, one type has a threshold value that is constant across geographical location, for example carbon emission. A second type has a threshold value that typically changes based on the geographical location such as weather and local policies. With the first type, centralized computing system 101 can modify the threshold values and update them by syncing with edge servers 104 and 105, respectively, via sync paths 153 and 154, respectively. With the second type, centralized computing system 101 (for example, at central collaborator engine 402) obtains edge data 151 and 152 from the edge servers and utilizes the historical data and analyzes preventive measures obtained from historical logs to determine the dynamic threshold values. With some embodiments, edge data 151 and 152 may be processed by artificial intelligence techniques such as machine learning providing a robotic decision maker or threshold setter.

With some embodiments, centralized computing system 101 may support a sensor value threshold and prioritization calculator in order determine dynamic value of sensor threshold/prioritization data that is derived based on learnings/emergency situations from other locations. Centralized computing system 101 may also support a threshold and prioritization self-mutating algorithm based the calculator.

Global FPCL 403 obtains collected edge data 451 from central collaborator engine 402 and processes the collected edge 451 similar to local FPCL 303 as shown in FIG. 3. For example, global FPCL may hierarchically combine collected edge data 451 and may further randomize the combining the prioritized collected edge data.

While the functioning of global FPCL 403 and local FPCL 303 is similar, the scope is different. Local FPCL 303 typically uses data from the local data center 102 while global FPCL 403 uses data from across the locations and not specific to one data center.

Global decision output 453 (the output of global FPCL 403) may then be provided to reporting/resolution layer 108.

Figure 8:
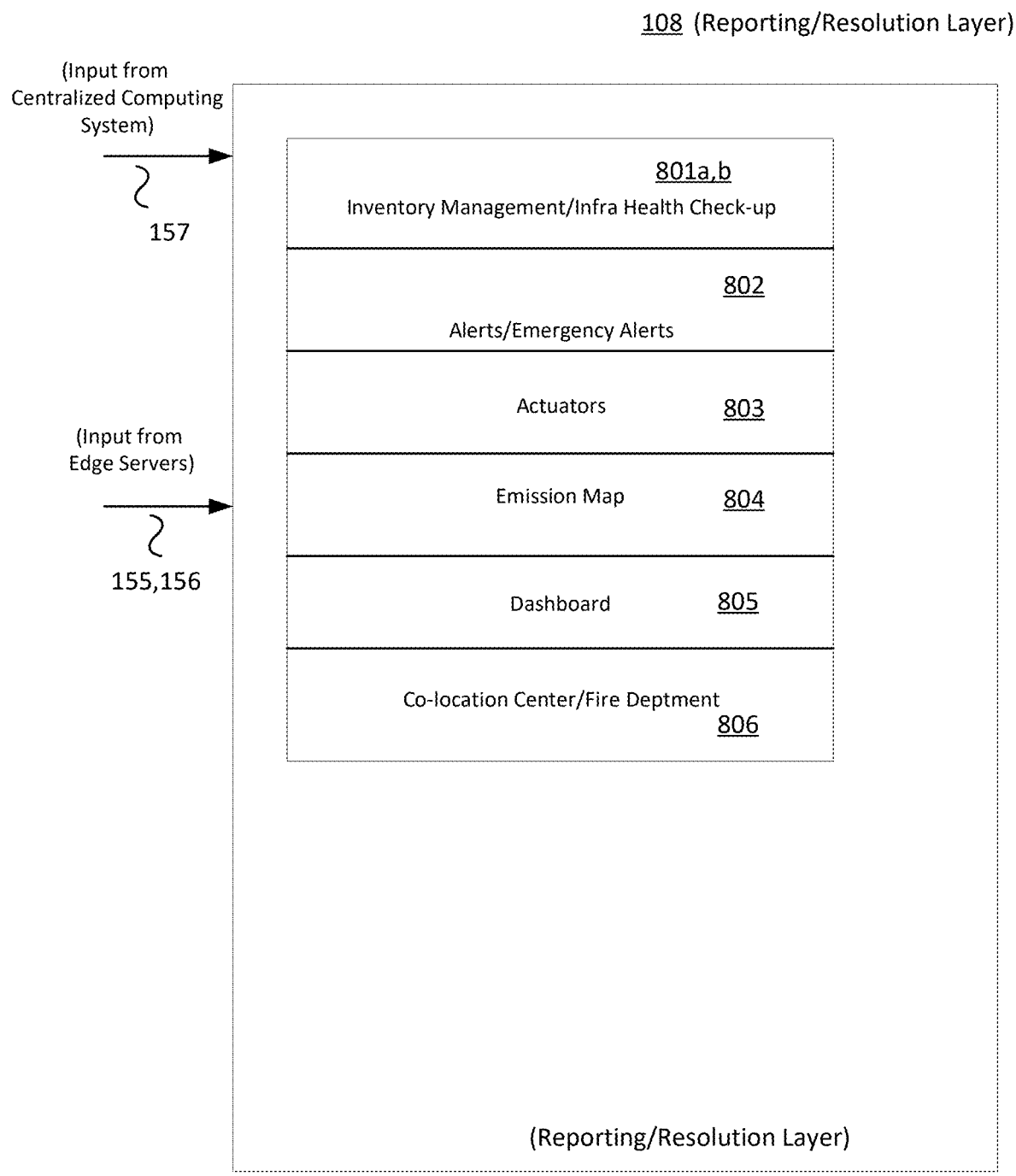
FIG. 8 illustrates a reporting/resolution layer as shown in FIG. 1 according to one or more illustrative embodiments.

Using the historical data in global FPCL 403 and analyzing the preventive measures taken from a historical log can assist in determining sensor thresholds at the cloud. A portion of the interpretation may need human intervention but the robotic decision maker may be employed to do the same. Moreover, additional information such as processed data and decision making information from central prioritizer 401 and central collaborator engine 402 may also be provided to reporting/resolution 108 as shown in FIGS. 1 and 8.

Figure 6:
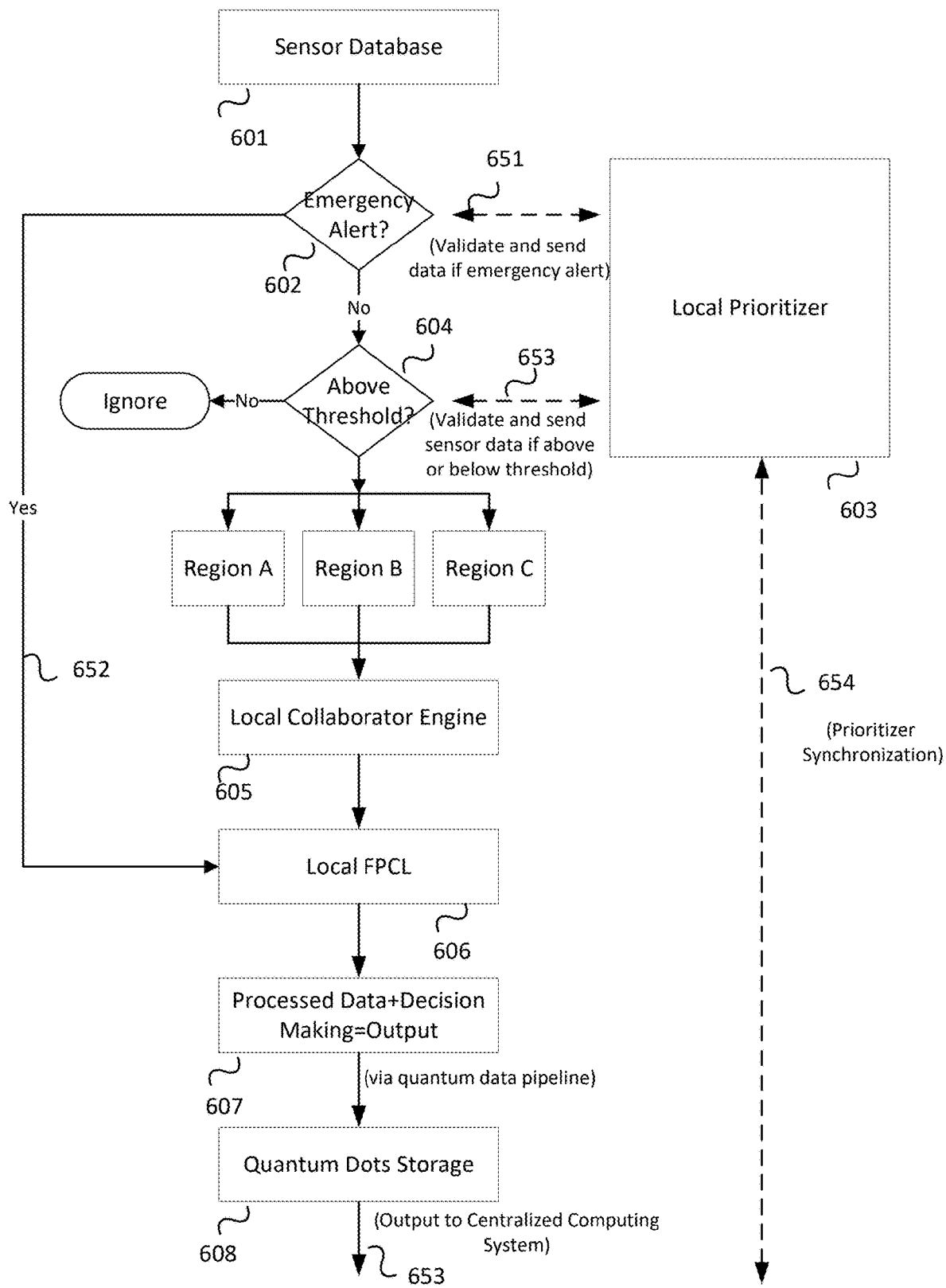
FIG. 6 illustrates processing of sensor data at an edge server according to one or more illustrative embodiments.

FIG. 6 illustrates processing of sensor data at an edge server such as edge server 104 as shown in FIG. 3.

Sensor database 601 (for example, corresponding to sensor storage 301 as shown in FIG. 3) stores sensor data from sensors 106a-106n for subsequent processing by local prioritizer 603 and local collaborator engine 605.

At block 602, local prioritizer 603 validates whether sensor data is indicative of an emergency (for example, a fire alarm indicative of a fire at data center 102). If so, emergency data is sent to local FPCL 606, where emergency data 652 may be included in the determination of the decision output and/or included in the data transported over the quantum data pipeline to quantum storage quantum dots storage 608 via data combiner 607.

In addition, local prioritizer 603 determines validates sensor data with respect to the dynamic sensor threshold (either above or below a threshold depending on the type of sensor). If so, the sensor data is passed to local collaborator engine 605; otherwise, the sensor data is ignored.

Sensor data to local collaborator engine 605 may be further partitioned into regions (for example, regions A, B, and C) so that local collaborator engine 605 appropriately prioritizes sensor data across different locations within a data center. For example, data center 102 may have a plurality of temperature sensors. Local collaborator engine 605 may prioritize a subset of the plurality of temperature sensors to ensure that temperature measurements are represented over all of the desired locations of the data center.

Local collaborator engine 605 presents prioritized collected edge data and applies fuzzy logic on the prioritized collected edge data in a randomized hierarchal manner to obtain a global decision output data. Data combiner 607 may then combine the global decision output data with processed sensor data and/or emergency data, so that the combined data can be stored in quantum dots storage 608, which can be provided to central computing system 101 as edge data.

As previously discussed, local prioritizer 603 communicates with central computing system 101 via path 654 in order to synchronize the dynamic prioritization data and the dynamic sensor threshold data.

Figure 7:
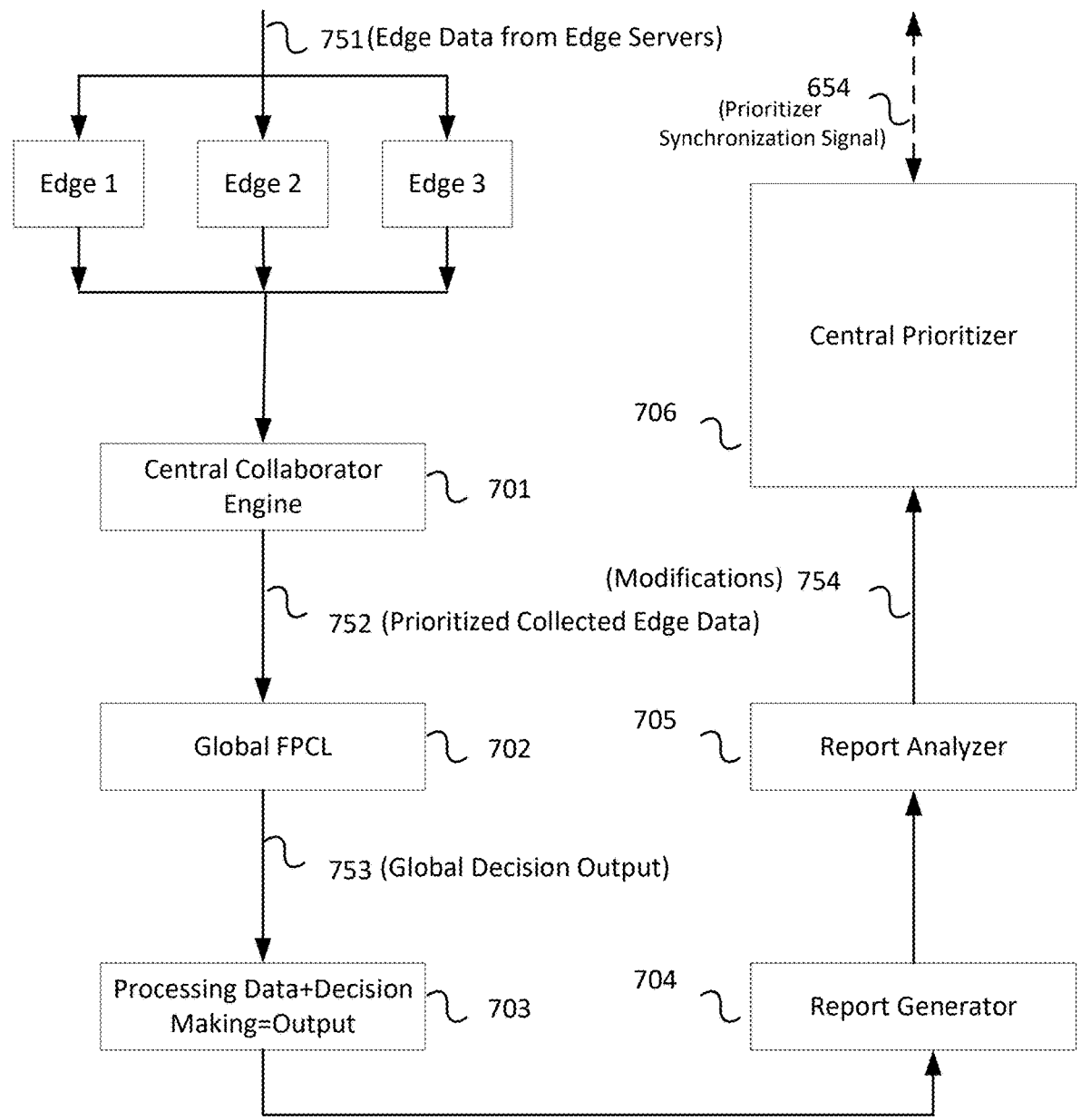
FIG. 7 illustrates processing of edge data from one or more edge servers by a centralized computing system according to one or more illustrative embodiments.

FIG. 7 illustrates processing of edge data 751 from one or more edge servers by centralized computing system 101 as shown in FIG. 4.

Central collaborator engine 701 collects edge data 751 from the plurality of edge servers and prioritizes the collected edge data to form prioritized collected edge data 752. Also, central collaborator engine may consume edge data 751 and determine the dynamic sensor threshold data and dynamic prioritization data from the edge data. Central collaborator engine 701 may utilize a self-mutating algorithm based calculator to determine the dynamic sensor threshold data and dynamic prioritization data.

Central collaborator engine 701 presents the prioritized collected edge data 752 to global FPCL 702, which then hierarchically combines prioritized collected edge data 752. As previously discussed, global FPCL 702 obtains global decision output 753 and presents it to data combiner 703 so that it may be combined with processed edge data. Central computing system 101 may present global decision output 753 and/or processed edge data to reporting/resolution layer 108.

Central collaborator engine 701 may uniformly distribute prioritized collected edge data 752 over the plurality of edge servers in order to avoid biasing the data with respect to any particular edge server. Consequently, the resulting processed edge data will be better representative of the plurality of data centers. For example, a balanced representation over all of the edge servers helps to ensure that global decision output 753 generated by global FPCL 702 is not biased by any one particular data center.

Report generator 704 may then generate a report that is indicative of the data centers based on the combined data. Also, information from the report may be presented to report analyzer 705. Report analyzer 705 may then provide modifications of the synchronization data 754 to central prioritizer 706 based on analyzing the report information.

As previously discussed, central prioritizer 706 synchronize synchronization data (for example, dynamic sensor threshold data and dynamic prioritization data) with a localized prioritizer of each edge server over path 654.

With some embodiments, report analyzer 705 may apply machine learning to determine the modifications to the synchronization data.

FIG. 8 illustrates reporting/resolution layer 108 as shown in FIG. 1 according to one or more illustrative embodiments. Reporting/resolution layer 108 may be implemented by a computing device as a part of a computing system, or partially by cloud computing services.

Reporting/resolution layer 108 typically supports a plurality of functions. For example, reporting/resolution layer 108 may support inventory management 801a, infra health check-up 801b, alerts 802, actuators 803, an emission map 804, a dashboard 805, and co-location/fire department notification 806.

Reporting/resolution layer 108 may monitor and present data in dashboards and reports. It may also alert a co-location data center to take over, or may alert the fire department, or alert a respective technicians.

Reporting/resolution layer 108 may also remotely trigger one or more actuators associated with one or more sensors 106a-106n at data center 102 as shown in FIG. 2. For example, reporting/resolution layer 108 may initiate one or more cooling fans associated with one of the sensors for a temperature rise.

Figure 9:
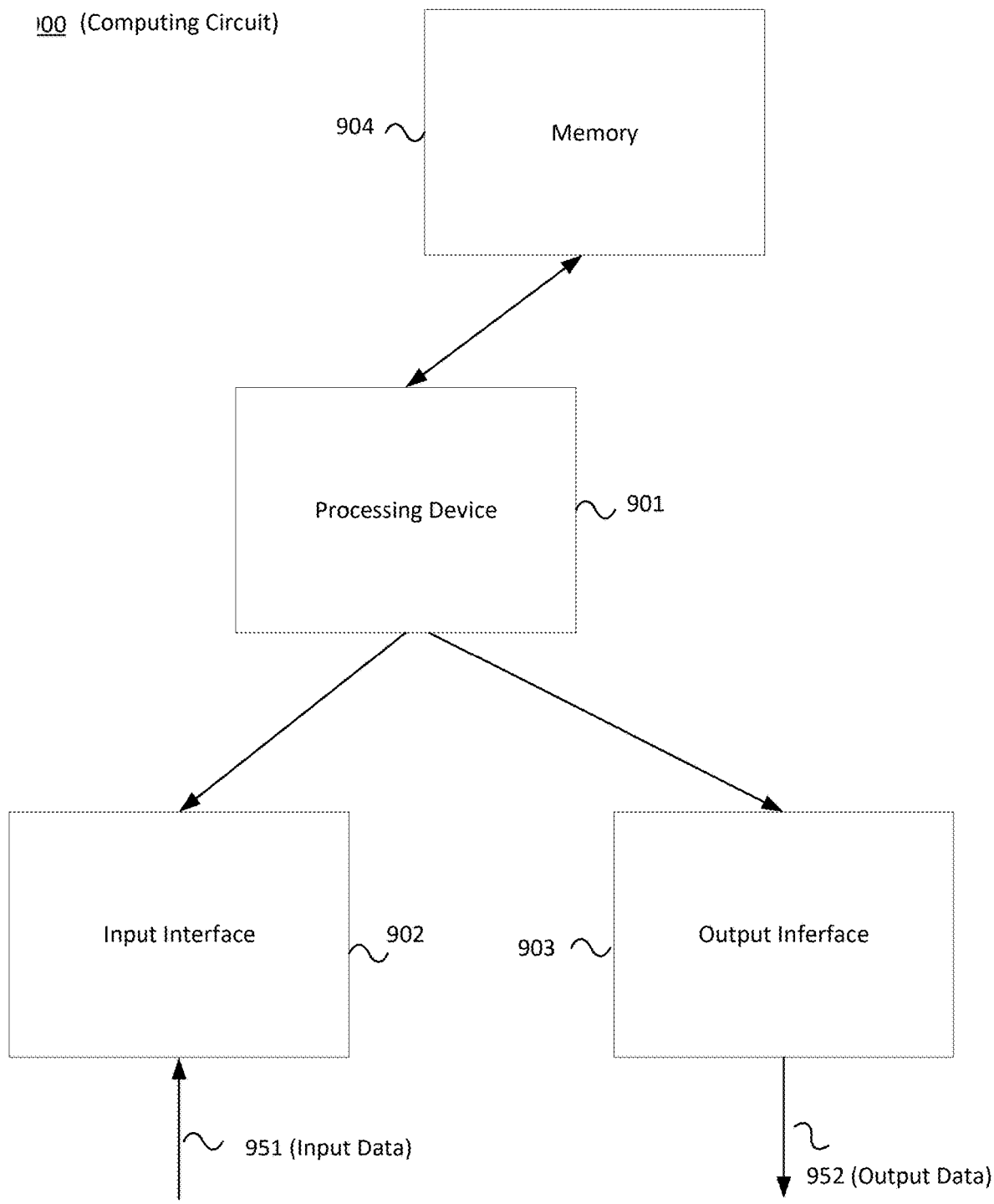
FIG. 9 illustrates a computing circuit that may be incorporated into edge servers, centralized computing device, or reporting/resolution layer as shown in FIG. 1 in accordance with one or more example embodiments.

FIG. 9 illustrates a computing circuit that may be incorporated into edge servers 102 and 103, centralized computing system 101, or reporting/resolution layer 108 as shown in FIG. 1 in accordance with one or more example embodiments.

Referring to FIG. 1, centralized computing system 101, edge servers 102 and 103, or reporting/reporting layer 108 may comprise processing device 901, memory device 904, input interface 902, and output interface 903. Processing device 901 may execute computer-readable instructions stored at memory device 304 in order to execute processes to process the sensor data. Processing device 901 may receive sensor data from sensors 601a-601n and process the sensor data. Processed sensor data, synchronization data, and/or emergency data may be exposed via output interface 903.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (for example, air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A data center, comprising:
    a plurality of sensors, wherein at least one sensor of the plurality of sensors includes a quantum dot panel embedded in the at least one sensor to self-power the at least one sensor and to convert heat generated within the data center to electrical power for the at least one sensor;
    an edge server in communication with the plurality of sensors, the edge server including at least one processor and memory storing computer-executable instructions that, when executed by the at least one processor, cause the edge server to:
        receive, from the plurality of sensors, sensor data;
        store the sensor data;
        filter the sensor data by comparing the sensor data to a dynamic sensor threshold;
        execute priority logic to prioritize the filtered sensor data according to determined priority components received from a central computing system;
        process, by a local fuzzy probabilistic controller logic, the prioritized, filtered sensor data using fuzzy logic on the prioritized, filtered sensor data to obtain localized decision output data;
        store the localized decision output data; and
        transmit, using quantum dots and via a quantum data pipeline, the localized decision output data to a quantum data storage.

2. The data center of claim 1, wherein the edge server further includes instructions that, when executed, cause the edge server to:
    combine the localized decision output data with processed sensor data; and
    transmit the combined data to the quantum data storage via the quantum data pipeline.

3. The data center of claim 1, wherein the filtered sensor data is further prioritized based on a geographical location.

4. The data center of claim 1, wherein processing, by the local fuzzy probabilistic controller logic, the prioritized, filtered sensor data is perfected upon detection of an emergency alert.

5. The data center of claim 1, the edge server further including instructions that, when executed, cause the edge server to:
    synchronize data with the central computing system.

6. The data center of claim 1, wherein a value of the dynamic sensor threshold is received from the central computing system.

7. The data center of claim 6, wherein the received dynamic sensor threshold is adjusted based on a localized edge sensor threshold value.

8. The data center of claim 1, wherein the prioritized, filtered sensor data is hierarchically combined to obtain the localized decision output data.

9. The data center of claim 8, the edge server further including instructions that, when executed, cause the edge server to:
    partition the prioritized, filtered sensor data into heterogeneous sensor data and homogeneous sensor data.

10. The data center of claim 8, wherein the hierarchical combining comprises:
    combining a first fuzzy mapping with a second fuzzy mapping to obtain a third fuzzy mapping, wherein the first, second, and third fuzzy mappings associate sensor data with fuzzy logic values.

11. The data center of claim 1, the edge server further including instructions that, when executed, cause the edge server to:
    detect a high priority alert; and
    send emergency data to a cloud computing entity.

12. The data center of claim 1, further comprising:
    a gateway configured to monitor data traffic for sensor information from the plurality of sensors and to detect whether an exception occurs.

13. The data center of claim 12, further comprising:
    a monitoring and control engine (MCE) configured to generate a signal to one of the plurality of sensors associated with the exception, wherein the signal is directed to the exception.

14. A method for providing data about an outage, the method comprising:
    receiving, by an edge server of a data center, the edge server having at least one processor and memory, sensor data from a plurality of sensors, wherein at least one sensor of the plurality of sensors includes a quantum dot panel embedded in the at least one sensor to self-power the at least one sensor and to convert heat generated within the data center to electrical power for the at least one sensor;
    storing, by the edge server, the sensor data;
    filtering, by the edge server, the sensor data by comparing the sensor data to a dynamic sensor threshold value;
    executing, by the edge server, priority logic to prioritize the filtered sensor data according to determined priority components received from a central computing system;
    processing, by the edge server, the prioritized, filtered sensor data using fuzzy logic on the prioritized, filtered sensor data to obtain localized decision output data;
    storing, by the edge server, the localized decision output data; and
    transmitting, by the edge server and using quantum dots via a quantum data pipeline, the localized decision output data to a quantum data storage.

15. The method of claim 14, further comprising:
sending the localized decision output data from the quantum data storage to the central computing system.

16. The method of claim 14, further comprising:
receiving the dynamic sensor threshold value from the central computing system; and
adjusting the received dynamic sensor threshold value based on a localized edge sensor threshold value.

17. One or more non-transitory computer-readable media storing instructions that, when executed by an edge server of a data center comprising at least one processor, and memory, cause the edge server to:
receive sensor data from a plurality of sensors, wherein at least one sensor of the plurality of sensors includes a quantum dot panel embedded in the at least one sensor to self-power the at least one sensor and to convert heat generated within the data center to electrical power for the at least one sensor;
store the sensor data;
filter the sensor data by comparing the sensor data to a dynamic sensor threshold value;
execute priority logic to prioritize the filtered sensor data according to determined priority components received from a central computing system;
process the prioritized, filtered sensor data using fuzzy logic on the prioritized, filtered sensor data to obtain localized decision output data;
store the localized decision output data; and
transmit, using quantum dots via a quantum data pipeline, the localized decision output data to a quantum data storage.

* * * * *